United States Patent [19]

Theis

[11] 4,328,396

[45] May 4, 1982

[54] TOTAL SERVICE TELEPHONE ANSWERING SYSTEM

[76] Inventor: Peter F. Theis, 3203 Bayview La., McHenry, Ill. 60050

[21] Appl. No.: 856,105

[22] Filed: Nov. 30, 1977

Related U.S. Application Data

[63] Continuation of Ser. No. 605,240, Aug. 18, 1975, abandoned, which is a continuation-in-part of Ser. No. 439,445, Feb. 4, 1974, abandoned, and Ser. No. 604,390, Aug. 15, 1975.

[51] Int. Cl.³ .................. H04M 11/10; G11B 19/00
[52] U.S. Cl. .................................................. 179/6.04
[58] Field of Search ............................ 179/6 C, 6 E

[56] References Cited

U.S. PATENT DOCUMENTS

| | | | |
|---|---|---|---|
| 2,328,562 | 9/1943 | Lesavoy | 179/6 C |
| 3,111,561 | 11/1963 | Dunning | 179/6 C |
| 3,300,586 | 1/1967 | Shepard | 179/6 E |
| 3,553,378 | 1/1971 | Alter et al. | 179/6 C |
| 3,705,961 | 12/1972 | Nye et al. | 179/6 E |
| 3,780,227 | 12/1973 | Pirnie, Jr. et al. | 179/6 C |
| 3,809,810 | 5/1974 | Walker et al. | 179/6 E |
| 3,904,836 | 9/1975 | Mohammadioun | 179/6 E |
| 3,965,304 | 6/1976 | Marheine | 179/6 C |
| 3,995,121 | 11/1976 | Alvis | 179/6 C |
| 4,150,255 | 4/1979 | Theis et al. | 179/6 C |

Primary Examiner—Vincent P. Canney
Attorney, Agent, or Firm—Hume, Clement, Brinks, Willian & Olds

[57] ABSTRACT

A total service telephone answering system including answering machines, for carrying on a programmed telephone conversation with a respondent, having an interface with the telephone line, and a control for altering the course of the programmed conversation when a disconnect signal is passed by the interface. The system contemplates serving a multiplicity of incoming telephone with a number of line operator stations, with the capability of overflow calls being handled by the answering machines. The system also includes a concentrator which continuously sweeps the incoming telephone lines to select any line having an unanswered call, continuously sweeps the answering machines to identify an available machine, and then effects a connection between the selected telephone line and the available machine.

5 Claims, 7 Drawing Figures

TOTAL SERVICE TELEPHONE ANSWERING SYSTEM

RELATED APPLICATIONS

This application is a continuation of U.S. application Ser. No. 605,240 filed Aug. 18, 1975 and entitled TOTAL TELEPHONE ANSWERING SYSTEMS, now abandoned, which was a continuation-in-part of U.S. applications Ser. No. 439,445 filed Feb. 4, 1974, now abandoned, and presently pending Ser. No. 604,390 filed Aug. 15, 1975, both applications being entitled PROGRAMMED CONVERSATION RECORDING SYSTEM.

BACKGROUND OF THE INVENTION

This invention relates to a programmed conversation recording system that can automatically create a facsimile of a live conversation under the control of a prerecorded program with an unrehearsed and untrained respondent and that can record information supplied by the respondent. Such systems have uses such as in answering telephones automatically (particularly where detailed information is to be obtained), in teaching systems, in training systems, in testing systems and in data collection systems.

A number of telephone answering systems are presently in use which use individual features such as programmed response times, programmed silence times and programmed pause times. Some systems use voice actuated circuitry for performing various functions but none of the existing systems is flexible enough to permit automatically programmed two-way conversations capable of eliciting a substantial amount of detailed information from a caller. A number of computerized training systems using keyboard entry also exist.

This invention further relates to a total service-type phone system such as might be used by department stores for order taking or by airlines for reservations handling. In such systems, a number of operators are provided to perform the primary function of servicing calls arriving on a group of lines. The number of operators normally depends upon the number of lines to be served and the expected traffic volumne. Generally, it is not feasible to provide sufficient operators to handle all calls live, during peak periods, and it is customary to provide machine assistance for putting calls on hold.

In any case, in the state of the art systems, there are significant draw-backs which can frequently lead to alienation of the caller. For example, the caller may be put on hold for an extended period with no recourse other than to hang up, thereby losing one's place in the sequence so that on the next call the caller is likely to be put on hold and the extended period will be as long or longer as on the first call. In other instances, the systems are such that a call is simply not answered for an extended period of time and this is equally undesirable. In some of the current systems where a call is answered because the system shows that the call has been either on hold for too long or has been ringing for too long, the system arrangement is such that the live operator can afford no more time than that required to take down the name and number of the caller, thus requiring a call-back at a later time.

There is, thus, a need for a more efficient machine supported total service phone system and this requires greater flexibility and options available to the live operators in their interfacing with the machine portion of the system.

SUMMARY OF THE INVENTION

The present invention provides a system wherein a selected set of control tones and prerecorded message sections are disposed on a recording medium so that the control signals associated with each message section determine a response sequence that is particularly suited to the message. The system uses voice actuated equipment for responding to the silence, speech length and speech pauses of the user in accordance with the particular control signal that governs that section of the conversation.

More specifically, the invention provides a telephone answering system wherein successive message sections are placed on a tape or a combination of tapes, usually to ask the caller a series of questions, with a delay time between the questions operated by voice actuated circuitry. The delay time between questions is programmable by the cooperation of control signals and voice actuated circuitry and can be varied depending on the caller's anticipated reply pattern. The voice actuated circuitry has the capability of varying the pause length under program control.

The presently preferred embodiment provides a long delay prior to speech sending and thereafter switches to pause sensing under program control. When an anticipated response does not occur, the preferred embodiment provides for advancing the program playout, with muting thereof, until a special condition control signal is sensed.

Another feature of the invention involves the use of a superimposed control signal in conjunction with a plurality of separate prerecorded programs to provide for switching to a separate program or other control function upon the occurrence of a particular response characteristic.

The invention further provides a total service answering system for a multiplicity of incoming phone lines being serviced by one or more operator stations for normally handling calls live and being supplemented by one or more automatic answering machines for handling overflow calls by automatically conversing with a caller and recording the caller's response.

In one aspect of the invention, a concentrator controls connection of the answering machine or machines to the incoming phone lines by continuously sweeping the phone lines to select any line having an unanswered incoming call thereon for longer than a pre-determined delay period and automatically connecting the selected line to any available answering machine.

Where a number of answering machines are used, the concentrator continuously sweeps the machines to select one that is available for connection to the selected incoming line.

In another aspect of the invention, separate monitor/intercept means is connected to each answering machine and is located at the operator station to play responses being recorded on such machine to enable live monitoring thereof by the operator. The monitor/intercept means is responsive upon pick-up by the operator for automatically completing a live connection to the incoming line being serviced by the answering machine and for disconnecting the answering machine from that line to free the machine for automatically servicing other incoming calls.

Since the automatic machines are primarily to supplement a live operator station system, the machines store recorded responses and provide a signal to the operator station that a recorded call is available for playback and servicing. A delay alarm is provided to signal the operator stations when such a stored response has remained unserviced for more than a reasonable time.

The concentrator which controls selection of incoming lines and available machines is in the form of a matrix having a separate row for each incoming line and a separate column for each answering machine. Clock circuitry sequentially pulses the matrix intersections to effect connections between a selected line and a selected machine without duplications. Upon termination of any machine handled call, the matrix effects release of the phone line and/or disconnect and recycling of the machine.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification, and in which like numerals are employed to designate like parts throughout the same.

DESCRIPTION OF THE PREFERRED EMBODIMENT

Figure 3:
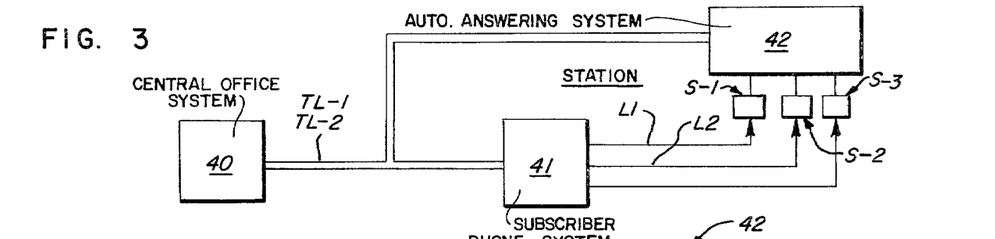
FIG. 3 is a generalized block diagram of a total service system.

A conventional telephone system for which the present invention is applicable is shown in FIG. 3 wherein a central office system 40 connected to feed a set of trunk lines TL-1, TL-2, etc. that supply the subscriber's phone system 41. The conventional subscriber phone system has lines L-1, L-2, etc. leading to each of a plurality of operator stations S-1, S-2, etc.

In the typical case, the automatic answering system 42 of this invention is connected in parallel with the subscriber phone system as shown in FIG. 3, however, the concepts of the invention are equally applicable, for example, to automatic call distributor systems, key equipment and Centrex systems.

In a typical total-service type phone system, as illustrated herein, the automatic answering system 42 includes one or more automatic answering machines connected to handle overflow calls on several phone lines. Normally, each call is handled live but during peak periods or when staffing is light, the answering machine handles overflow calls in a unique fashion that coordinates with the functions required to be performed by the live operators.

Figures 1, 2:
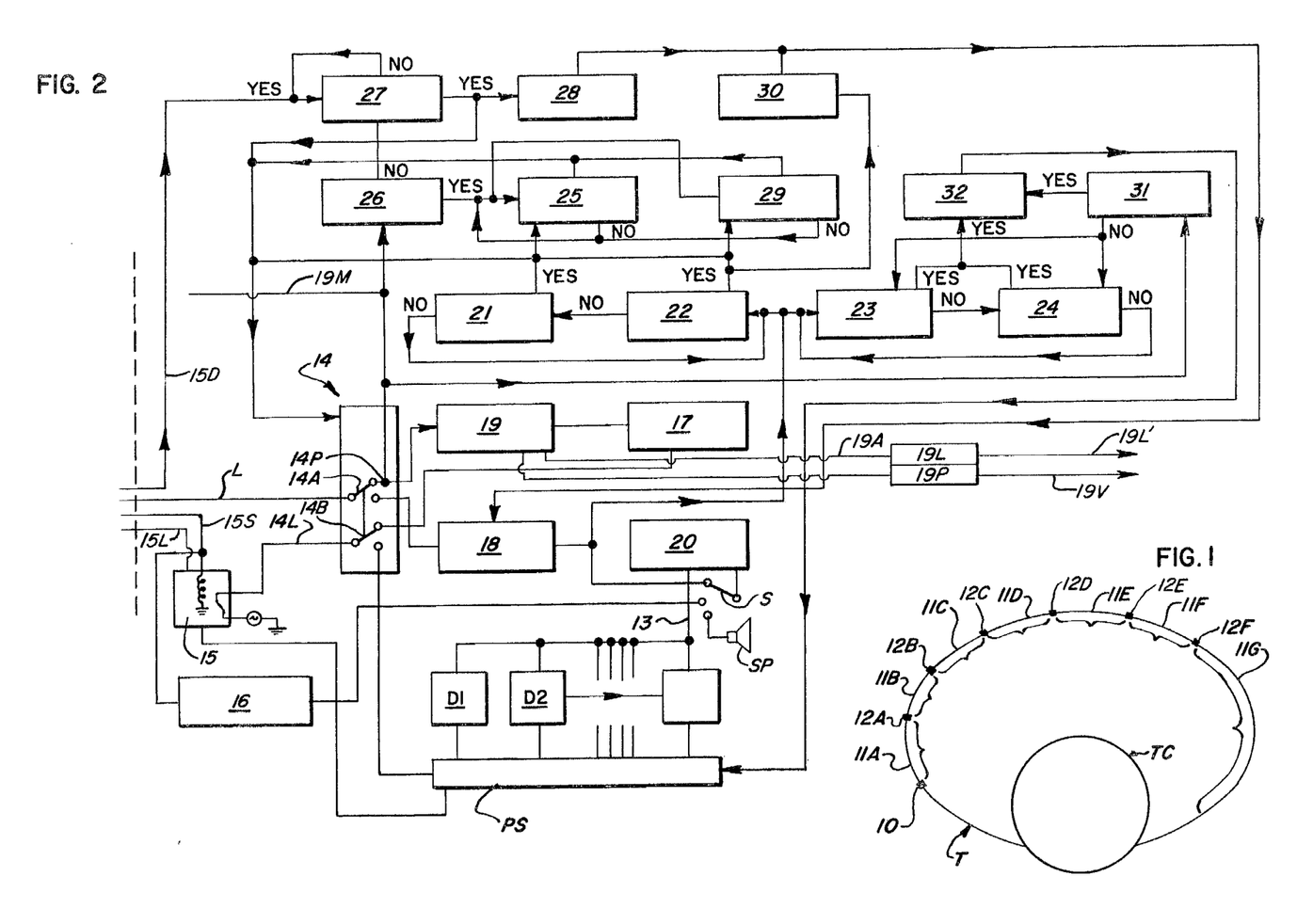
FIG. 1 is a diagram of a continuous tape loop provided with an outgoing message program.
FIG. 2 is a block diagram of an automatic answering machine suitable for use in a total service phone system in accordance with this invention.

Referring now to the drawings, the general sequence of operation of the announcement function of the present system in the case of a typical automatically programmed conversation is summarized with reference to the prerecorded continuous loop tape T which, as shown in FIG. 1, is associated with a tape cartridge TC for insertion into a tape deck.

The prerecorded tape T is shown provided with a foil tab 10 followed by specific prerecorded messages provided on tape regions 11A to 11F arranged to create a facsimile of a live conversation with the caller. The tape region 11G contains a "special condition" message. Between the message sections, the tape is provided with prerecorded control signals 12A to 12F, each being of a fixed frequency or of a fixed length or of some fixed parameter having a value in accordance with the control function required at that particular location in the sequence.

In addition, the control signal may specify that if a particular response or speech interval is shorter than a specified interval, the system should switch to a separate and different prerecorded tape or other function.

Typical control functions determined by the values of the control signals are:

(a) a pause interval, namely the interval following the completion of a response; for example, a 6 KHz tone (hereafter referred to as frequency A) may denote a pause of 2 seconds and a 5 KHz tone (hereafter referred to as frequency B) may denote a pause of 9 seconds;

(b) a superimposed signal, for example an 8 KHz tone to indicate that if the response is of less than 5 seconds duration, the system will switch to a separate and different program tape.

The use of tones of these frequency values is because existing telephone equipment will not transmit them to the caller. This system does not require a tone signal following the message section to tell a caller when to respond.

The tone 12A that follows the first message section 11A signals the system that the first outgoing message region 11A is completed and sequences the system to record an incoming response. If an incoming response is not received in a pre-set interval, typically 10 seconds, the prerecorded tape will advance without playing outgoing messages from sections 11B to 11F until it detects a special condition control signal 12F.

If an incoming response is sensed within a predetermined interval, for example 10 seconds, the system will continue recording until a pause (a period of relative silence) of predetermined length is sensed. The duration of the pause is controlled by the control signal 12A. When that pause is sensed the prerecorded tape T will play message segment 11B and the incoming message recording is terminated.

The sequence continues until the foil tab 10 is reached or the following occurs: if control signal 12A or a subsequent control signal includes a superimposed signal, the system will be conditioned, depending upon the particular response length, to switch to a separate program while advancing the original program to the foil tab 10.

It will thus be seen that the system employs a unique interaction between the content of the message sections, the time for a response to begin, the length of the response, and the pause following the response so that under automatic program control and voice actuated sequencing, a facsimile of a live conversation can be achieved, with the responses being recorded for subsequent processing. In addition, the system provides the option to switch to a different program where the response indicates the need.

The circuit arrangement and connections for a typical system, as shown in FIG. 2, are arranged to connect to a telephone interface arrangement such as an RDM-ZR installed by the telephone company. The system, as shown herein, includes one or a number of program decks D1, D2, etc. that are shown connected to a tape deck power sequencer PS. Each tape deck includes a head assembly for recording and playback from a tape T of the type shown in FIG. 1 and has its input/output connected to a common audio line 13.

The telephone interface RDM-ZR has an audio line L connected to an upper contact 14A of a control means 14 that includes ganged switch contacts 14A, 14B shown in incoming message mode position. A cycle start unit 15 is connected either to be activated by a message preparation unit 16 that is used for initially recording a tape T or to be activated by the ring-up circuit from the RDM-ZR. A three-position switch S is shown in the normal operating position. The switch S can also be set to receive output from the preparation unit 16 for initially preparing a prerecorded message and signal program for each deck D1, D2, etc. Finally, the switch S can be set to play back a program to a speaker SP.

When the control means 14 is in the incoming message mode as shown, it applies power over line 14L and switch contact 14B to a drive mechanism 17 for an incoming message tape deck. Correspondingly, the audio line L from the recorder coupler RDM-ZR is connected through switch contact 14A to a junction point 14P. The junction point 14P connects audio to a combined audio amplifier and tape deck system 19 that is powered by the unit 17 for recording the responses of the caller.

When the control means 14 is switched to the outgoing message mode, it applies power over line 14L and switch contact 14B to drive the tape deck power sequencer PS which applies power to the proper program tape deck D. Correspondingly, the audio line L is connected through the audio muting gate 18 to the output of an audio preamplifier and amplifier system 20 which receives input from the proper program deck D.

The cycle start unit 15, upon being activated by an incoming call, causes power to be applied to D1 and causes the RDM-ZR to seize the telephone line. The first message 11A on deck D1 is played through the amplifier system 20 and the then inactive audio muting gate 18 to the calling party.

When the first control signal 12A is played through an audiopreamplifier and amplifier system 20, it is applied to decoding means which includes a set of tone decoders 21, 22, 23, 24. If the tone has a frequency A, it will trigger decoder 21 and apply a trigger through its YES terminal to activate a logic circuit 25 that acts as a pause detector. The YES terminal of 21 is also connected to cause the control switch 14 to disconnect the program deck D and apply power to the incoming message tape deck 17. Audio line L is switched to the audio amplifier 19 for recording the response. The incoming audio is also connected from junction 14 P to a speech detector 26 which is for sensing silence intervals preceding an incoming message segment and pause intervals occurring during an incoming message.

Considering the alternative wherein no speech is detected, typically within 10 seconds (as preset in the unit 26), the special condition control 27 is activated thereby activating the audio muting control 28 thereby activating the audio muting gate 18.

Additionally, the special condition control 27 will cause the control switch 14 to revert to the outgoing message mode; however, because the muting gate 18 is active no audio can be transmitted from aplifier 20 to the calling party. The program deck D1 is reenergized and continues to play the prerecorded program until tone decoder 22 is activated.

When the deck D1 plays a tone having the frequency B, it will trigger decoder 22 and apply a trigger to its YES terminal which energizes the muting deactivation control 30, thereby activating the muting gate 18, and which returns the system to normal operation in the outgoing message mode.

Considering the other alternative wherein the speech detector 26 does detect speech within 10 seconds, its YES terminal triggers pause detector 25. If, subsequently, the YES terminal of 26 is off for 2 seconds, the pause detector 25 will cause the control means 14 to revert to its outgoing message mode. This cycle will progress until the end of the tape is reached.

If a second tone B is detected by tone decoder 22, a logic circuit 29 acting as a pause detector 29 will be activated by the YES terminal of 22. The YES terminal of decoder 22 is connected to switch 14 to function the same as previously described for decoder 21.

If the speech detector 26 does detect speech within 10 seconds, its YES terminal activates pause detector 29. If, subsequently, the YES terminal of 26 is off for 9 seconds the pause detector 29 will cause the control 14 to revert to its outgoing message mode. This cycle will progress until the end of the tape is reached.

The system includes provisions for responding to the length of the live speech interval for selecting the subsequent message content. Each of the tone decoders 23, 24 is responsive to a particular superimposed control signal to operate in conjunction with a speech length detector 31 for controlling a logic circuit 32 that is connected to the power sequencer PS to act as a program switch control. When the YES terminal of one of the decoders 23, 24 and the YES terminal of live speech detector 31 are activated, the program switch 32 will cause the power sequencer to switch from the previously active program deck to start a separate program deck.

If a tone A includes a superimposed tone A-1 that is recognized at any point, the previously described sequence will be the same except that tone decoder 23 will also be energized. If speech detector 31 detects speech for a period typically less than 5 seconds, the program switch 32 will cause the power sequencer PS to activate and switch power to the next deck D2 and cause deck D1 to run until foil tab 10 is reached.

If detector 31 receives speech for more than 5 seconds, its NO terminal causes reset of tone decoder 23.

If tone B includes a superimposed tone B-1 that activates decoder 24, a similar sequence occurs.

When all program tape decks D1, D2, etc., that may have been started, have recycled to the foil tab 10, the system cycle is complete.

TYPICAL SEQUENCE OF OPERATIONS

1. An incoming call is detected by the telephone company interface RDM-ZR. This in turn signals the cycle control unit 15 and causes the system to start its cycle. Concurrently, the cycle control 15 causes the RDM-ZR to sieze and complete the telephone line connection.

2. The control means 14 is normally in the outgoing mode position. Program deck D1 will begin playing the first message 11A, such as "May we help you?", through the audio amplifier 20 and the deactivated muting gate 18. Following this message on the program tape, and recorded on the tape at the same time as the program was recorded is a control tone 12A. This control tone A is sensed by the tone decoder 21.

3. Tone decoder 21 causes the control means 14 to switch to the incoming message position. When in this position, the program tape deck D1 is inactive and the incoming tape deck 17 is powered and the amplifier 19 is active.

4. The caller will respond with an answer such as "I would like to place an order". This will be recorded on the incoming message tape deck 17. This incoming message will also be sensed by the speech detector 26. When the incoming response stops, a continuous signal will be sent to the pause detector 25 which has previously been activated by the tone decoder 21. When a 2 second pause is detected in the speech by the pause detector 25, the control means 14 will revert to the outgoing message position and program deck D1 will start with the next message segment 11B.

5. The next question might ask for the caller's name, repeating the sequence of steps 2 through 4. This sequence may be repeated several times as various questions are asked in message segments 11C, 11D, etc.

6. The question "What is your charge account number?" might typically be asked. In this case, as an example, the caller must go get his charge number so an immediate response may not be forthcoming. The speech detector 26 will not be activated until speech is sensed. This prevents the system from proceeding to the next question even though the lapse in speech is longer than 2 seconds prior to giving a response. Once the caller has responded, the speech detector is activated and the 2 second pause will be sought.

6A. If the caller did not respond at all within a reasonable period, typically 10 seconds, the special condition control 27 is activated. This causes the muting control 28 to activate thereby energizing the audio muting gate 18. The control means 14 is switched to the outgoing message position. Thus, the program tape D1 will restart but the caller will not hear the program because the audio muting gate 18 will block audio to the caller.

6B. When the program reaches the position 12F, a second tone B is sensed by the tone detector 22, the muting deactivation control 30 is energized, thereby deactivating the audio muting gate 18. Thus, the calling party will start hearing the outgoing message; for example, "Your call is being terminated. If your order is not complete, plese call again and answer each question as it is asked." Additionally, the special condition control 27 will be activated causing the system to revert to normal operation. Normally, this feature is used to tell a calling party that has been inadvertently cut off to call back again. It can also be used to automatically sequence the system to an entirely different part of the program tape.

7. If the program proceeds normally as described in step 6, when the program reaches each tone position, each control tone is sensed by a tone detector to cause the control switch 14 to switch to the incoming message position. When in this position, the program tape deck D is inactive and the incoming tape deck circuits are active 17, 19.

8. During normal operation of the program, if the caller responds with an indefinite answer such as "Let me think now", followed by a longer pause before making a further response, this is recorded on the incoming message tape units 17, 19. The incoming message is also sensed by the speech detector 26. When the speech stops, a signal is sent from the speech detector 26 to the pause detector 29 which has previously been activated by the tone detector. When a pause, typically set at from 6 to 10 seconds, is sensed by the pause detector 29, the control switch 14 will revert to the outgoing message position and program deck D1 will start with the next message segment 12E.

9. If the control tone being sensed has a second signal superimposed thereon and is sensed by tone decoder 23, the system will also evaluate the duration of the speech period. Thus, for an outgoing message such as "If you need operator assistance, please ask for the operator; otherwise, your order will be taken automatically if you will start by giving us your complete address.", if the caller said "Operator", there would be less than 5 seconds of speech, and speech detector 31 would cause the program switch 32 to cause the tape deck sequencer to shift to a second program deck D2 to change the outgoing message to that appropriate for the short answer "Operator".

9A. If the caller answers by stating a complete address, there would be more than 5 seconds of speech so that the speech detector 31 is not activated. This longer answer will not cause the program deck sequencer to change program decks but deck D1 will continue with the in line program.

10. When the foil tab 10 is sensed electrically, that tape deck is stopped. When all program decks have been stopped by the foil tab, the cycle is complete and the system is ready to accept the next incoming call.

The time intervals given herein are suited to a number of commercial order taking programs but are not intended to limit the scope of the invention. Each type of interval described herein may have either a greater time or lesser time depending upon the particular situation.

Certain additional connections for such an answering machine are also illustrated in FIG. 2 to better illustrate the specific connection of the answering machine in the total telephone answering system. Thus, the unit 19 which is disclosed as a tape deck for recording of incoming messages is shown connected through an indicator line 19A that actuates an indicator unit 19L, or call waiting, light to indicate that there is a message which has been received and recorded; and is shown connected through a line 19B for transmitting voice to a playback unit 19P. The record and playback equipment may be of any suitable type such as the continuous loop recording systems sold under the names Dictaphone "Thought-Tank" or Lanier "Nyematic". On FIG. 2 an indicator line 19L', a voice line 19V and a monitor line 19M are also shown and are described hereinafter.

In addition, a machine available line 15L such as conventionally is incorporated in a cycle start unit 15 is shown in FIG. 2 because its connection to other components of the total system is shown in other figures of the drawings. The line 15L, when functioning in connection with an RDM-ZR in a conventional telephone answering system responds to energization of the cycle start unit to signal the RDM-ZR to seize and hold the phone line. The signal continuously acts on the RDM-ZR while the answering machine is in its cycle. At the end of the answering machine's cycle, release of the cycle start unit changes the condition on the machine available line and allows the RDM-ZR to release the phone line.

For purposes of the present total service type answering system, the machine available line 15L serves primarily to signal that the cycle start unit 15 is in its released state such that the particular answering machine is available to handle any incoming call that requires immediate attention.

Figure 4:
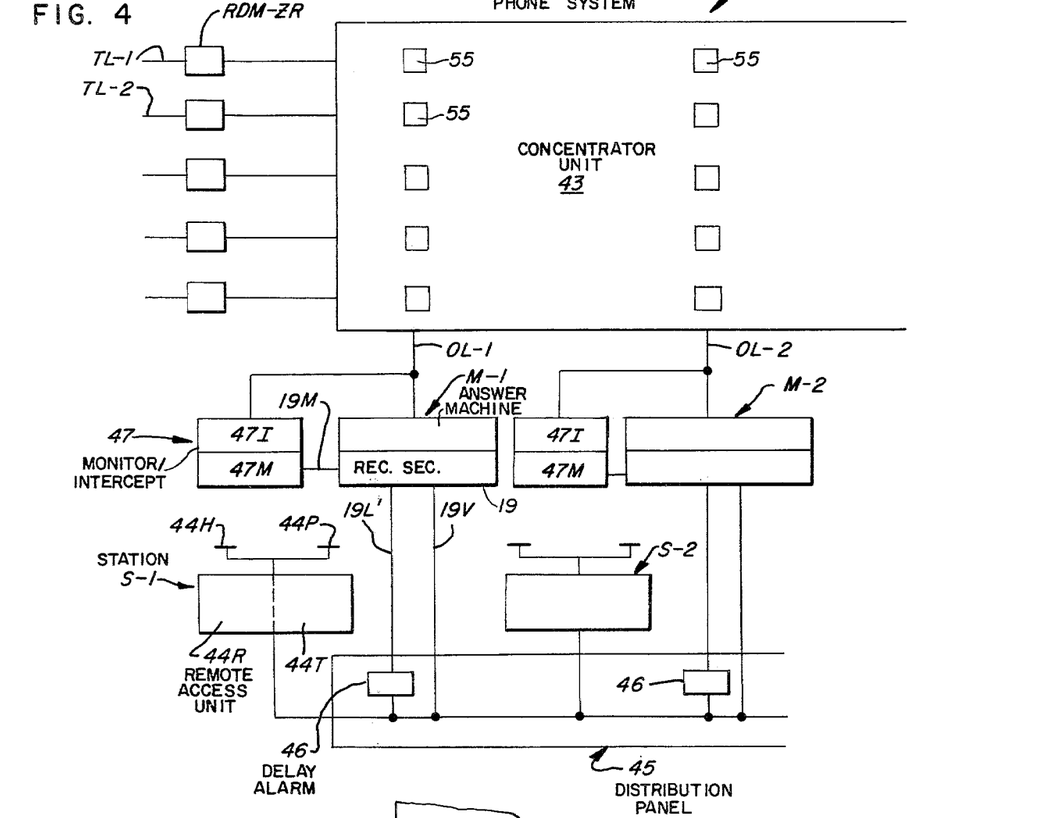
FIG. 4 is a detailed block diagram of the total service system of FIG. 3.

As shown in FIG. 4, the input connections to the automatic answering system components provided in accordance with the invention are made through a recorder coupler or RDM-ZR for each incoming trunk line. The incoming trunk lines TL-1, TL-2, etc. are shown connected to a matrix type concentrator unit 43 and outgoing lines OL-1, OL-2, etc. from the concentrator unit 43 go to a plurality of separate automatic answering machines M-1, M-2, etc. such as are shown in FIG. 2 hereof.

As is shown in FIG. 4, a number of stations S-1, S-2 for live operators are provided, each operator station being a console which typically includes a headset 44H, a foot pedal 44P and a transcribe unit 44T, all of which are conventional commercially available equipment. In addition, in a complete system in accordance with the preferred practice of the invention, the system includes a remote access unit 44R at each operator station and a common distribution panel 45 for completing connections from the message storage and playback section of any one of the answering machines to any one of the operator stations. The remote access unit 44R includes operator controlled switching facilities connected to the distribution panel 45 to allow each operator to receive a stored message indication from any of lines 17L' and to select the corresponding answering machine for the purpose of transcribing or otherwise servicing the recorded message present on such machine.

Generally, when an answering machine handles a call and records incoming message material for storage, an indication is transmitted over line 19L' to each operator's console. Normally, one of the operators will promptly play back the machine's recorded message and process the information or call back if that should be necessary. The indicator lines 19L' that lead from the message playback section of each of the answering machines are connected through delay alarm units 46 located in the distributor panel 45. After a recorded call indication has been on an operator's console for a certain period of time, the delay alarm unit provides a warning signal by a flashing indication, or otherwise, that the reasonable time limit for servicing such recorded message has been exceeded.

Each telephone answering machine is also shown connected to a corresponding monitor/intercept unit 47 which is basically a conventional telephone modified in that it has an amplifier and speaker that are cut off when its telephone is off hook.

The monitor/intercept unit 47 incorporates two distinct control sections 47M, 47I. Section 47M serves to monitor responses being recorded in the telephone answering machine, it being connected through monitor line 19M to the record section 19 of the answering machine and section 47I serves to permit an operator to intecept any call currently being handled on the associated answering machine without having to make any line selection operation.

Figure 5:
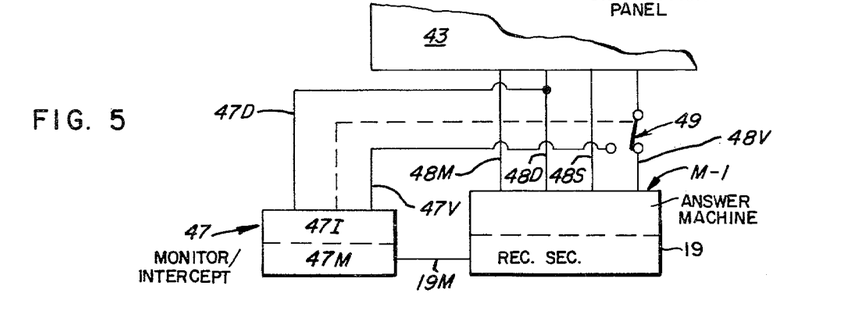
FIG. 5 is a detailed connection diagram of the monitor/intercept position of the system.

To explain the monitor/intercept function in detail, reference is made to FIG. 5 wherein the outgoing lines from the concentrator 43 to one of the answering machines are shown and identified. Thus, line 48M is a machine available line corresponding to line 15L of FIG. 2; line 48D is a disconnect line corresponding to line 15D of FIG. 2; line 48S is a start-up line corresponding to line 15S of FIG. 2; and line 48V is a voice line corresponding to line L of FIG. 2.

As shown in FIG. 5 for purposes of illustrative disclosure, the intercept section has a disconnect line 47D tied directly to the disconnect line 48D between the concentrator and the answering machine M-1 and it has a voice line 47L connected to a terminal of a two position switch 49 which is provided in the main voice line between the concentrator and the answering machine. The switch 49 is controlled by a switching circuit in the intercept section 47I. It will be apparent that other connections for achieving the same monitor/intercept functions may be employed.

Normally, the speaker of the monitor section 47M plays the incoming messages of each conversation being recorded by the corresponding answering machine so that the operator can decide whether to intercept the call being recorded in order to handle the same live. The operator merely picks up the monitor phone and is immediately connected into the voice line 48 so that the operator can intercept the call without having to perform any line selection operations.

When the monitor phone of a monitor/intercept unit is picked up by the operator for any reason, the disconnect line 47D signals the corresponding answering machine to drop off the line to avoid recording the operator's line conversation with the caller and recycle so that the machine will recycle to be able to answer other incoming calls when the intercept has been concluded.

Normally, one monitor/intercept is located at each operator station but when there are more answering machines than operators, it is feasible to provide more than one monitor at an operator station.

The concentrator 43 serves as a selector between a multiplicity of incoming lines and one or more automatic answering machines. As previously described, the concentrator 43 is employed in a system that typically contemplates having most incoming calls answered live by the operators. Thus, the automatic answering machines M-1, M-2, ... M-N are intended to handle overflow calls whether due to a busy period or due to light staffing. Typically, in such a system, if the incoming call has not been answered live within a pre-determined reasonable time, the concentrator will connect it to any available automatic answering machine.

Figures 6, 7:
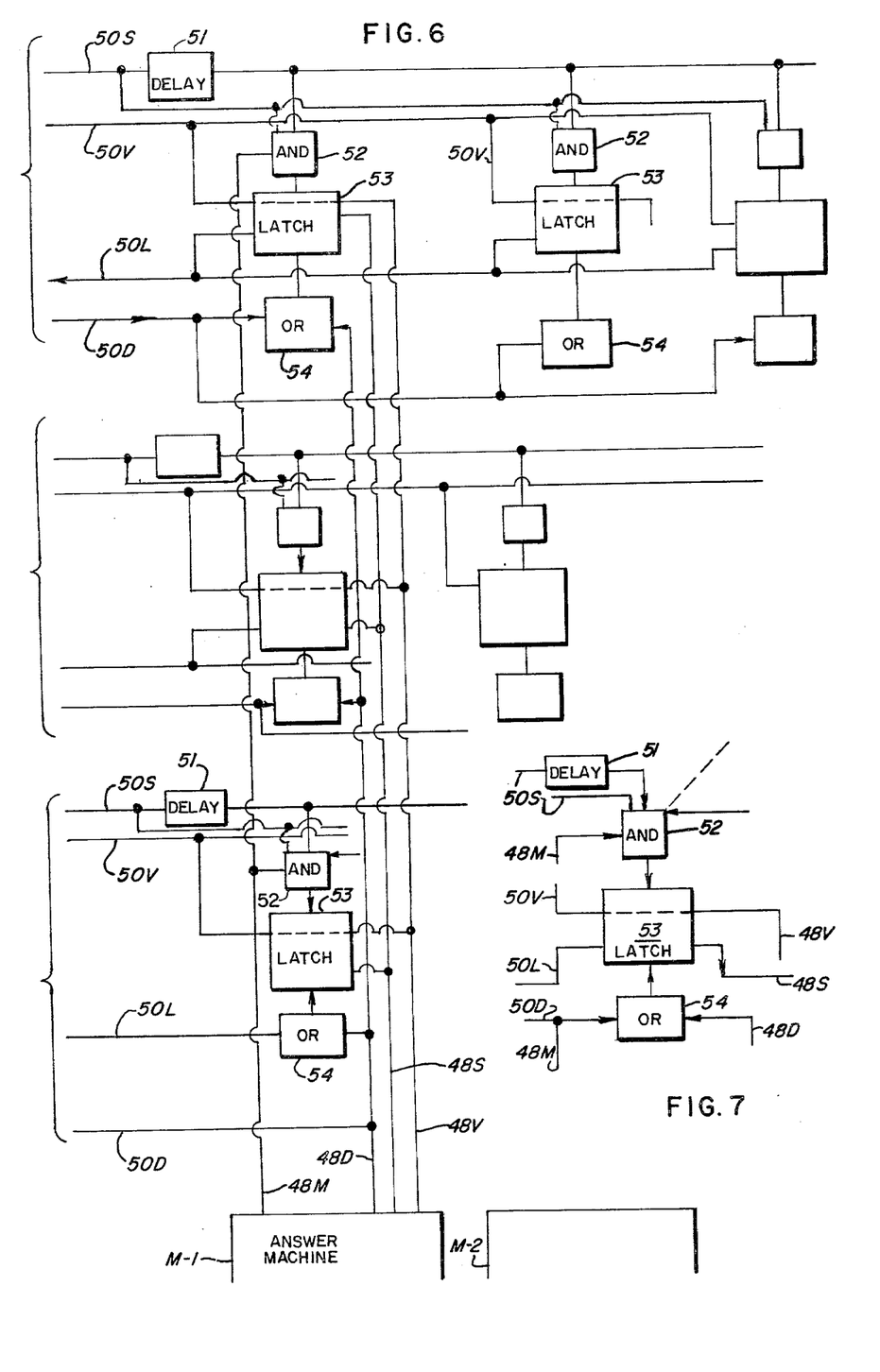
FIG. 6 is a diagram of a matrix type concentrator circuit for controlling connection of any incoming line having an unanswered call to any answering machine that is available.
FIG. 7 is an enlarged diagram showing the circuitry of one of the intersections of the matrix circuit.

The concentrator circuitry of FIG. 6 is disclosed herein in an embodiment suited for use with the conventional RDM-ZR voice connecting arrangement such as is currently required by published tariffs. The invention could be embodied in various other ways in the event the interface specifications should change or be eliminated as will be apparent to those skilled in the art.

The RDM-ZR corresponding to each incoming trunk line, as shown in FIG. 6 conventionally includes a start-up line 50S, a voice line 50V, a line seizure and line drop circuit 50L, and a disconnect line 50D.

The line seizure and line drop circuit 50L actually consists of two separate wires for controlling two different pulse circuits within each of the latch circuit 53 in the concentrator 43 to achieve line seizure and line drop functions as specified in A.T. & T. Technical Reference Manuals for the RDM-ZR.

As indicated generally in FIG. 4, and more specifically in FIG. 6, the concentrator 43 functions as a matrix having a row corresponding to each incoming phone line and a column for each answering unit. Clocking circuitry actuates each matrix intersection 55 in a pre-determined sequence to effect continuous sweeping of the machine available lines 48M from the answering machines and to effect continuous sweeping of the start-up lines 50S of the multiplicity of phone lines through a delay circuit 51. The delay circuit 51 requires repeated pulsing from the start-up line 50S to continue a service request. There is a time slot for each intersection of the matrix such that a sweep clock will strobe each intersection at a discrete moment in time, thereby avoiding simultaneous latching. Thus, the concentrator can effect a connection only when a call has remained unanswered for a pre-determined amount of time. Typically, the delay period is in a range between six and sixty seconds, i.e., from one ring to ten rings.

A typical matrix intersection is shown enlarged in FIG. 7 as including an AND gate 52 which is strobed from the clocking circuitry via line ST, a latching circuit 53 which is latched under the control of the AND gate and an OR gate 54 which controls unlatching of the latch circuit. The inputs to the AND gate are applied from the start-up line 50S, from its variable delay element 51 to apply a service request signal after a predetermined delay period has occurred and from a machine available line 48M which leads from the cycle start unit 15 of the answering machine to apply a signal whenever that machine is available in a re-cycled conditioned for answering a call.

Thus, when both conditions of a service request and a machine available are met, the AND gate 52 will actuate the latch circuit 53, upon being strobed via line ST by the clocking circuitry. At the time of seizure, the latch circuit will complete a connection from the voice line 50V associated with the incoming call to the voice line 48B of the associated answering machine; it will also generate a signal on the cycle start input line 48S to the answering machine; it will also generate a signal on the line seizure and drop circuit 50L to the RDM-ZR to cause it to seize the telephone line.

The OR gate 54 will respond to unlatch the latched circuit 53 upon receiving a signal either over the disconnect line 48D or the disconnect line 59D. At the time the latch circuit unlatches, it generates a signal which is applied over the line seizure and drop circuit 50L to the RDM-ZR to cause the incoming line on which the call was handled to be released.

The time slots are generated by two synchronized electronic counter circuits (not shown) which sweep the AND gates 52 via corresponding lines ST of each matrix intersection.

Thus, while preferred constructional features of the invention are embodied in the structure illustrated herein, it is to be understood that changes and variations may be made by those skilled in the art without departing from the spirit and scope of the appended claims.

What is claimed is:

1. A telephone answering and conversing system comprising:
    a matrix of gate means including at least one group of horizontally arrayed gates, and at least one group of vertically arrayed gates;
    at least two incoming phone lines, each line associated with one of said groups of horizontally arrayed gates, and each line adapted to pass a start-up signal to each gate means in the group of horizontally arrayed gates with which it is associated, said start-up signal being indicative of an incoming call from a caller;
    at least two answering means, each answering means associated with one of said groups of vertically arrayed gates, and each answering means adapted to pass an answering means-available signal to each gate means in the group of vertically arrayed gates with which it is associated, said answering means-available signal being indicative of the availability of an answering means for conversing with a caller;
    means for passing a strobe interrogation signal to each of said gate means; and
    latch means coupled to each of said gate means, for coupling a phone line to an answering means upon coincidence of said start-up signal, said answering means-available signal and said strobe interrogation signal at any one of said gate means.

2. The system defined in claim 1 further includes a plurality of delay means, disposed in advance of each of said gate means, for delaying passage of said start-up signal to said gate means for a predetermined time.

3. The system defined in claim 1 further includes a plurality of unlatching means coupled to each of said latch means; said unlatching means producing an unlatching signal which interrupts the coupling from an incoming phone line to an answering means upon receipt of a disconnect signal from an incoming phone line indicative of the termination of said call.

4. In a telephone answering system that includes a multiplicity of incoming phone lines, each of said incoming phone lines having a start-up line coupled to an adjustable delay circuit, a first voice line, and a line seizure and drop circuit, the comination of:
    a plurality of automatic answering machines for automatically answering a caller and recording the caller's response, each of said answering machines including a start input line, a second voice line, a disconnect line, and a machine available line; and
    a concentrator for controlling connection of any one of said answering machines to any one of said incoming phone lines, said concentrator including sequentially strobed matrix intersection means and latching means associated with said incoming phone lines; said latching means being responsive through said matrix intersection means to strobed interrogation for connecting a selected associated phone line having an unanswered incoming call thereon to an available answering machine in response to said strobed interrogation; each of said matrix intersection means including an AND gate connected to said delay circuit and to said machine available line; said latching means responsive to said AND gate to complete a connection between said first and second voice lines and to trigger said start input line; said matrix intersection means further including a gate responsive to said disconnect line to unlatch the latch circuit and trigger said line seizure and drop circuit.

5. In a telephone answering system that includes a multiplicity of incoming phone lines, the combination of:

a plurality of automatic answering machines for automatically answering a caller and recording the caller's response;

a concentrator for controlling connection of any one of the answering machines to any one of the incoming phone lines, said concentrator including latching means associated with said phone lines and being responsive to strobed interrogation for connecting a selected associated phone line having an unanswered incoming call thereon to an available answering machine in response to said strobed interrogation;

at least one of said answering machines including playback means and indicating means for signaling the presence of a recorded incoming message;

an operator station with means for actuating said playback means; and, delay alarm means for signaling to the operator station after the indicating means has been activated for a pre-determined length of time.

* * * * *